(12) United States Patent
Kato

(10) Patent No.: US 11,158,884 B2
(45) Date of Patent: Oct. 26, 2021

(54) ALL SOLID STATE BATTERY

(71) Applicant: TOYOTA JIDOSHA KABUSHIKI KAISHA, Toyota (JP)

(72) Inventor: Yuki Kato, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 16/549,155

(22) Filed: Aug. 23, 2019

(65) Prior Publication Data

US 2020/0067143 A1 Feb. 27, 2020

(30) Foreign Application Priority Data

Aug. 24, 2018 (JP) .............................. JP2018-157613

(51) Int. Cl.
| | |
|---|---|
| *H01M 10/0585* | (2010.01) |
| *H01M 4/13* | (2010.01) |
| *H01M 10/0562* | (2010.01) |
| *H01M 10/0525* | (2010.01) |
| *H01M 10/0565* | (2010.01) |
| *H01M 4/76* | (2006.01) |
| *H01M 4/02* | (2006.01) |

(52) U.S. Cl.
CPC ......... *H01M 10/0585* (2013.01); *H01M 4/13* (2013.01); *H01M 4/76* (2013.01); *H01M 10/0525* (2013.01); *H01M 10/0562* (2013.01); *H01M 10/0565* (2013.01); *H01M 2004/025* (2013.01); *H01M 2004/028* (2013.01)

(58) Field of Classification Search
CPC .......... H01M 4/13; H01M 4/64; H01M 4/667; H01M 4/70; H01M 4/76; H01M 10/0562; H01M 10/0565; H01M 10/0585
See application file for complete search history.

(56) References Cited

U.S. PATENT DOCUMENTS

| | | | |
|---|---|---|---|
| 6,982,132 B1 * | 1/2006 | Goldner | ............ H01M 10/0585 429/162 |
| 2007/0202414 A1 * | 8/2007 | Yoshida | ............... H01M 4/5825 429/304 |
| 2014/0377621 A1 | 12/2014 | Hanyu et al. | |

FOREIGN PATENT DOCUMENTS

| | | | |
|---|---|---|---|
| JP | 2010231969 A | * | 10/2010 |
| JP | 2014-116127 A | | 6/2014 |
| JP | 6028237 B2 | | 11/2016 |
| JP | 2016192265 A | * | 11/2016 |
| JP | 2018-085310 A | | 5/2018 |

* cited by examiner

*Primary Examiner* — Gregg Cantelmo
(74) *Attorney, Agent, or Firm* — Sughrue Mion, PLLC

(57) ABSTRACT

Provided is an all solid state battery having improved charge-discharge capacity. The all solid state battery has a structure in which a current collector layer, an electrode body layer and a solid electrolyte layer are laminated in that order, wherein the electrode body layer has an active material layer and a conductive member, the active material layer contacts the solid electrolyte layer, the conductive member contacts the current collector layer and has a protruding portion, and the protruding portion protrudes towards the solid electrolyte layer from at least a portion of the surface of the current collector layer on the electrode body layer side, and contacts the surface of the active material layer in the direction of thickness thereof.

6 Claims, 5 Drawing Sheets

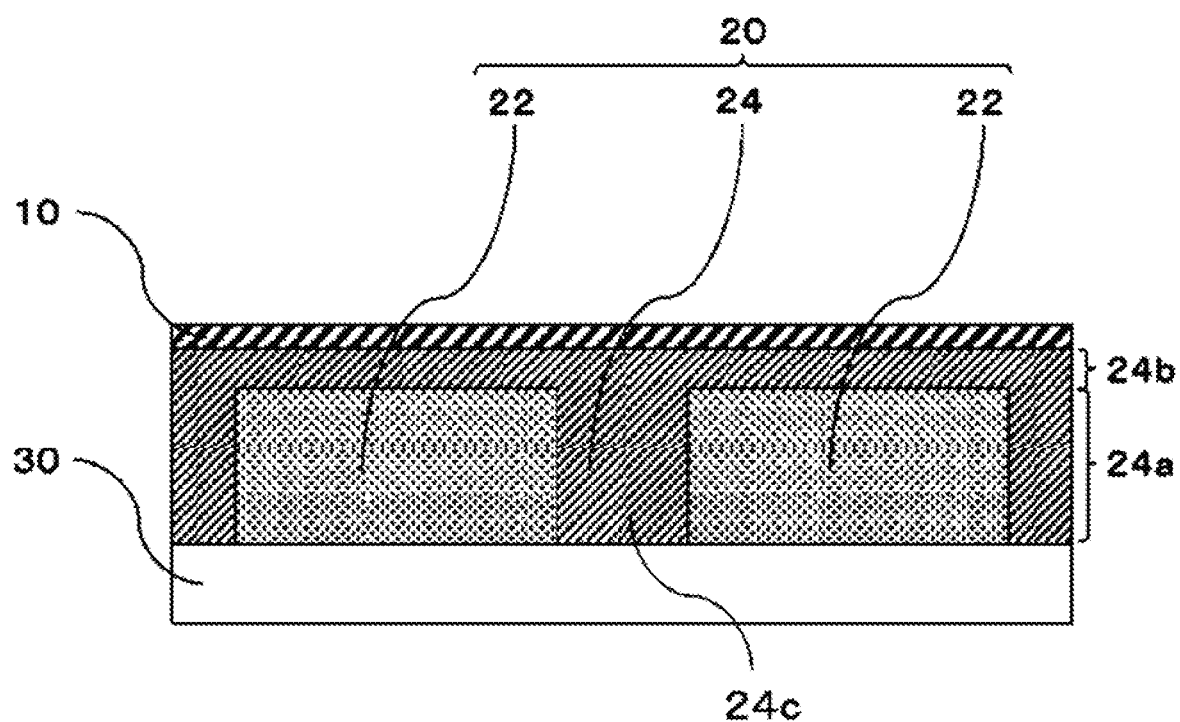

ALL SOLID STATE BATTERY

FIELD

The present disclosure relates to an all solid state battery.

BACKGROUND

All solid state batteries in which the liquid electrolyte is replaced with a solid electrolyte have attracted attention in recent years. In comparison with secondary batteries using a liquid electrolyte, all solid state batteries not using a liquid electrolyte are not subject to decomposition of the electrolyte caused by overcharging of the battery while also having high cycle durability and energy density.

The active material layer of an all solid state battery contains an active material, and other materials are known to be arbitrarily contained from such viewpoints as improving electrical conductivity of the active material layer and the utilization efficiency of the active material as well as improving the performance of the active material layer.

For example, PTL1 discloses an all solid state battery containing an active material, solid electrolyte and conductive additive in an active material layer. In this example of the patent literature, the conductive additive is thought to be able to improve electrical conductivity of the active material layer.

In addition, PTL2 discloses a positive electrode for an all solid state battery comprising a positive electrode active material layer in which composite particles containing positive electrode active material particles and oxide particles adhered to the surface of the positive electrode active material particles, and a solid electrolyte are contained. In this example of the patent literature, the oxide particles are claimed to be able to improve utilization efficiency of the positive electrode active material by reducing the interface resistance between the positive electrode active material particles and solid electrolyte.

Furthermore, PTL3 discloses various configurations of a secondary battery. This example of the patent literature discloses a secondary battery having a structure in which, for example, the lateral and bottom surfaces, but not the top surface, of a positive electrode active material layer are embedded in a solid electrolyte layer, and the top surface of the positive electrode active material layer is covered with a positive electrode current collector layer.

CITATION LIST

Patent Literature

[PTL 1] JP-A-2014-116127
[PTL 2] JP-A-2018-85310
[PTL 3] JP-6028237

SUMMARY

Technical Problem

The charge-discharge capacity of an all solid state battery is thought to be affected by not only the amount of active material, but also the ionic conductivity of the active material layer and the magnitude of electrical conductivity.

One means for improving electrical conductivity of the active material layer is thought to consist of containing a conductive additive in the active material layer as disclosed by PTL1, for example. However, although conductive additives have high electrical conductivity, they demonstrate low ionic conductivity. Consequently, when a conductive additive is added to an active material layer, ionic conductivity paths in the active material layer are thought to be inhibited resulting in a decrease in ionic conductivity in the active material layer. On the other hand, although it is thought that ionic conductivity of the active material layer can be improved if the content of conductive additive in an active material layer is reduced, electrical conductivity of the active material layer is thought to decrease.

In this manner, it has been difficult to improve the charge-discharge capacity of conventional all solid state batteries while realizing both ionic conductivity and electrical conductivity of the active material layer.

An object of the present disclosure is to provide an all solid state battery having improved charge-discharge capacity.

Solution to Problem

The inventor of the present disclosure found that the aforementioned object can be achieved by the means indicated below.

<Aspect 1>
An all solid state battery having a structure in which a current collector layer, an electrode body layer and a solid electrolyte layer are laminated in that order, wherein
the electrode body layer has an active material layer and a conductive member,
the active material layer contacts the solid electrolyte layer,
the conductive member contacts the current collector layer and has a protruding portion, and
the protruding portion protrudes towards the solid electrolyte layer from at least a portion of the surface of the current collector layer on the electrode layer side, and contacts the surface of the active material layer in the direction of thickness thereof.

<Aspect 2>
The all solid state battery described in Aspect 1, wherein the active material layer is a positive electrode active material layer.

<Aspect 3>
The all solid state battery described in Aspect 1 or Aspect 2, wherein the thickness of the active material layer is 200 µm or more.

<Aspect 4>
The all solid state battery described in any one of Aspects 1 to 3, wherein the end of the protruding portion of the conductive member forms the same plane with the surface of the active material layer on the solid electrolyte layer side.

<Aspect 5>
The all solid state battery described in any of Aspects 1 to 4, wherein the conductive member has a conductive layer extending between the active material layer and the current collector layer and the protruding portion protrudes towards the solid electrolyte layer from the conductive layer.

<Aspect 6>
The all solid state battery described in any of Aspects 1 to 5, wherein the protruding portion of the conductive member has a columnar shape protruding towards the solid electrolyte layer from the surface of the current collector layer on the electrode body layer side.

<Aspect 7>
The all solid state battery described in any of Aspects 1 to 5, wherein the protruding portion of the conductive member protrudes towards the solid electrolyte layer over the outer edge of the current collector layer.

Advantageous Effects of Invention

According to the present disclosure, an all solid state battery can be provided that has improved charge-discharge capacity.

BRIEF DESCRIPTION OF DRAWINGS

FIG. 3C is a schematic diagram showing the structure of a current collector layer, a conductive member, an active material layer and a solid electrolyte layer in still another embodiment of the all solid state battery of the present disclosure.

DESCRIPTION OF EMBODIMENTS

The following provides a detailed description of embodiments of the present disclosure. Furthermore, the present disclosure is not limited to the following embodiments, but rather can be carried out by making various modifications within the scope of the gist of the disclosure.

<<All Solid State Battery>>

The all solid state battery of the present disclosure is an all solid state battery having a structure in which a current collector layer, an electrode body layer and a solid electrolyte layer are laminated in that order, the electrode body layer has an active material layer and a conductive member, the active material layer contacts the solid electrolyte layer, the conductive member contacts the current collector layer and has a protruding portion, and the protruding portion protrudes towards the solid electrolyte layer from at least a portion of the surface of the current collector layer on the electrode body layer side, and contacts the surface of the active material layer in the direction of thickness thereof.

Although not limited by principle, the principle of the action of the all solid state battery of the present disclosure of improving charge-discharge capacity is thought to be as indicated below.

Figure 1:
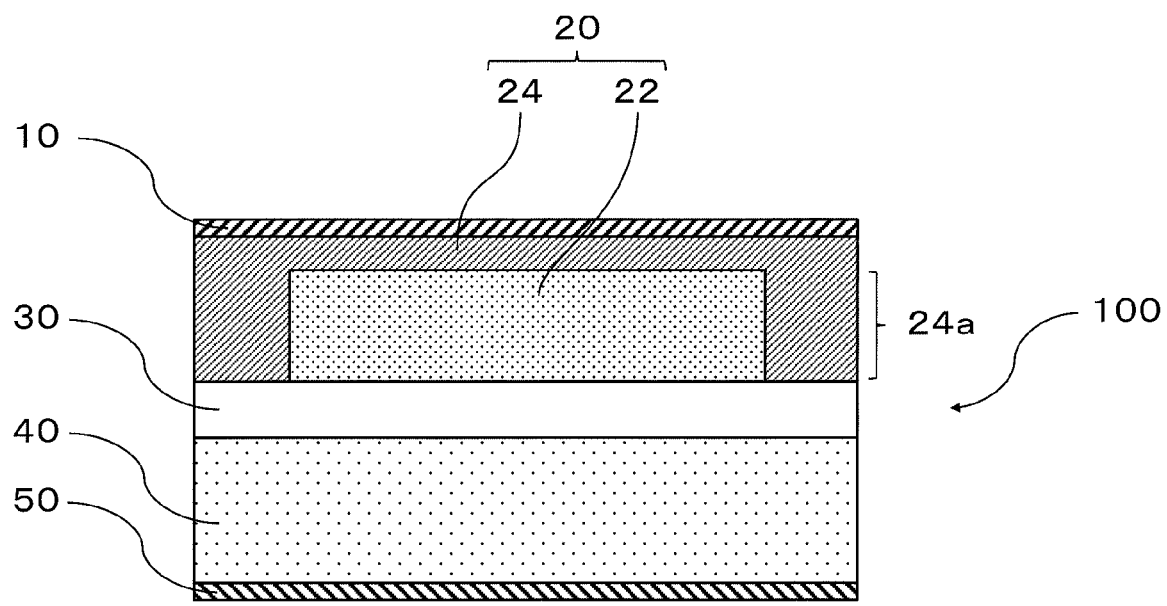
FIG. 1 is a schematic diagram showing an embodiment of the all solid state battery of the present disclosure.
Figure 2:
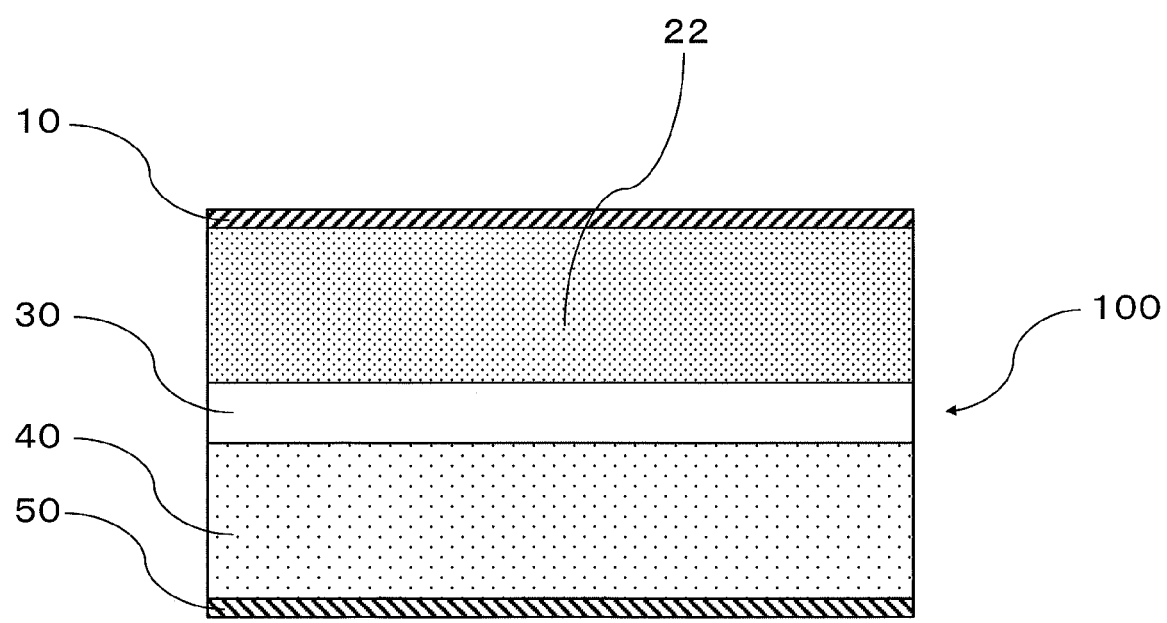
FIG. 2 is a schematic diagram showing one example of an all solid state battery of the prior art.

FIG. 1 is a schematic diagram showing an embodiment of the all solid state battery of the present disclosure. In addition, FIG. 2 is a schematic diagram showing one example of an all solid state battery of the prior art. Furthermore, FIG. 1 does not limit the aspects of the all solid state battery of the present disclosure.

In the embodiment of the all solid state battery of the present disclosure shown in FIG. 1, a positive electrode current collector layer 10, a positive electrode electrode body layer 20, a solid electrolyte layer 30, a negative electrode active material layer 40 and a negative electrode current collector layer 50 are laminated in this order in an all solid state battery 100. In addition, the positive electrode electrode body layer 20 has a positive electrode active material layer 22 and a conductive member 24. The positive electrode active material layer 22 contacts the solid electrolyte layer 30. The conductive member 24 contacts the positive electrode current collector layer 10 and has a protruding portion 24a. The protruding portion 24a protrudes toward the solid electrolyte layer 30 from at least a portion of the positive electrode current collector layer 22 on the positive electrode electrode body layer 20 side and contacts the surface of the positive electrode active material layer 22 in the direction of thickness thereof. In the case of charging and discharging this all solid state battery, electrons are able to migrate between the conductive member 24 and the positive electrode active material layer 22 via the interface between the conductive member 24 and the positive electrode active material layer 22.

In contrast, the example of an all solid state battery of the prior art shown in FIG. 2 is in common with all solid state battery of the present disclosure in that the positive electrode current collector layer 10, positive electrode active material layer 22, solid electrolyte layer 30, negative electrode active material layer 40 and negative electrode current collector layer 50 are laminated in that order in the all solid state battery 100. However, the all solid state battery of the prior art differs from the all solid state battery of the present disclosure in that it does not have a conductive member 24. In the case of charging and discharging this all solid state battery, electrons are able to migrate between the positive electrode current collector 10 and the positive electrode active material layer 22 via the interface between the positive electrode current collector 10 and the positive electrode active material layer 22.

As shown in FIGS. 1 and 2, in one embodiment of the all solid state battery of the present disclosure, the member having electrical conductivity has a larger surface area for the portion that contacts the positive electrode active material layer in comparison with the all solid state battery of the prior art. In particular, in one embodiment of the all solid state battery of the present disclosure, the member having electrical conductivity contacts that positive electrode active material layer at the surface of the positive electrode active material layer in the direction of thickness. Consequently, the embodiment of the all solid state battery of the present disclosure is able to transport electrons more efficiently than the all solid state battery of the prior art, and in particular, is able to transport more electrons in the direction of thickness of the positive electrode active material layer.

In this manner, in the all solid state battery of the present disclosure, since the surface area for the portion of the active material layer which contacts the member having electrical conductivity, or in other words, the current collector layer and conductive member, is larger than the surface area of the surface of the current collector layer on the active material layer side, it is capable of efficiently transporting electrons over a wider range of the active material layer.

In particular, since the conductive member of the all solid state battery of the present disclosure has a protruding portion, electrons can be transported to a portion located at a distance from the current collector layer side of the active material layer, or in other words, to a portion located at a distance from the current collector layer in the direction of thickness of the active material layer. Thus, charge-discharge capacity can be improved even if the thickness of the active material layer is increased.

In addition, differing from a conductive additive, since the conductive member is not dispersed within the active material layer, there is less inhibition of ionic conductivity paths of the active material layer in comparison with conductive additives.

Consequently, the all solid state battery of the present disclosure is able to improve electrical conductivity while maintaining ionic conductivity of the active material layer, and is able to improve charge-discharge capacity.

In addition, the inventor of the present disclosure found that the input characteristics of the all solid state battery tend to decrease the greater the thickness of the active material layer. This is thought to be due to decreases in electrical conductivity and ionic conductivity of the active material layer.

Thus, the configuration of the all solid state battery of the present disclosure is thought to be particularly effective in the case the thickness of the active material layer is large.

<<Electrode Body Layer>>

The electrode body layer has the active material layer and the conductive member.

<Conductive Member>

The conductive member is a member that contacts the current collector layer and has a protruding portion. In addition, the protruding portion protrudes toward the solid electrolyte layer from at least a portion of the current collector layer on the electrode body layer side and contacts the active material layer. The conductive member may contact the surface of the active material layer in the direction of thickness thereof. Here, the surface of the active material layer in the direction of thickness thereof refers to, for example, a lateral surface of the active material layer.

(Shape of Conductive Member)

There are no particular limitations on the shape of the conductive member provided it contacts the current collector layer and has a protruding portion.

The end of the protruding portion of the conductive member preferably forms the same plane with, i.e. is flush with the surface of the active material layer on the solid electrolyte layer side. As a result of the end of the protruding portion extending to the surface of the active material layer on the solid electrolyte layer side, in addition to electrons being able to be transported more efficiently in the direction of thickness, variations in the distribution of stress in the in-plane direction occurring within the all solid state battery can be reduced in the case expansion and contraction of the all solid state battery occurs accompanying charging and discharging.

In the all solid state battery of the present disclosure, the conductive member can have a conductive layer extending between the active material layer and current collector layer and the protruding portion has a shape that protrudes from the conductive layer towards the solid electrolyte layer.

In addition, in the all solid state battery of the present disclosure, the protruding portion of the conductive member can have a columnar shape 24c protruding toward the solid electrolyte layer from the surface of the current collector layer on the electrode body layer side.

In addition, in the all solid state battery of the present disclosure, the protruding portion of the conductive member can have a shape that protrudes toward the solid electrolyte layer over the outer edge of the current collector layer.

Figure 3A:
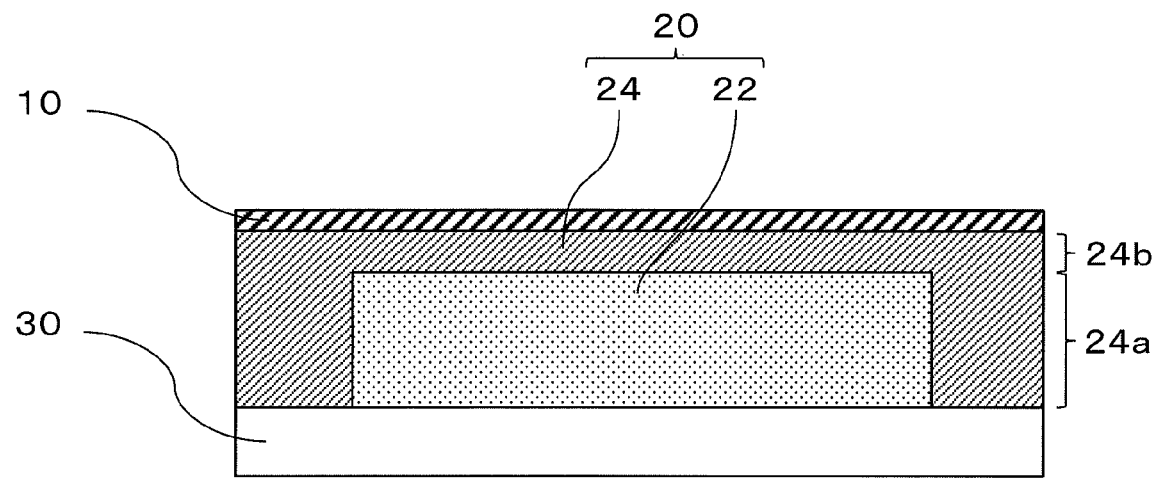
FIG. 3A is a schematic diagram showing the structure of a current collector layer, a conductive member, an active material layer and a solid electrolyte layer in an embodiment of the all solid state battery of the present disclosure.
Figure 3B:
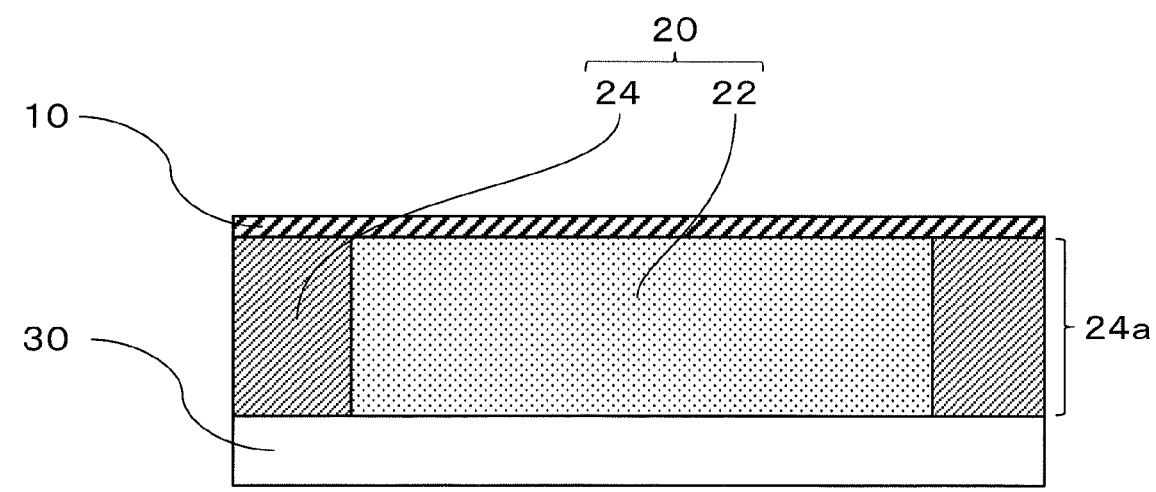
FIG. 3B is a schematic diagram showing the structure of a current collector layer, a conductive member, an active material layer and a solid electrolyte layer in another embodiment of the all solid state battery of the present disclosure.

The following indicates specific examples of the structure of the current collector layer, the conductive member, the active material layer and the solid electrolyte layer in embodiments of the all solid state battery of the present disclosure shown in FIGS. 3A to 3C. Furthermore, FIGS. 3A to 3C do not limit the aspects of the all solid state battery of the present disclosure.

FIG. 3A is a schematic diagram indicating the structure of the current collector layer, the conductive member, the active material layer and the solid electrolyte layer in an embodiment of the all solid state battery of the present disclosure.

In FIG. 3A, the electrode body layer 20 has the positive electrode active material layer 22 and the conductive member 24. The conductive member 24 is composed of a conductive layer 24b extending between the positive electrode current collector layer 10 and the positive electrode active material layer 22, and a protruding portion 24a protruding towards the solid electrolyte layer 30 from the outer edge of the positive electrode current collector layer 10. The surface of the positive electrode active material layer 22 on the solid electrolyte layer 30 side and the end of the protruding portion 24a of the conductive member 24 form the same plane and contact the solid electrolyte layer 30.

FIG. 3B is a schematic diagram indicating the structure of the current collector layer, the conductive member, the active material layer and the solid electrolyte layer in another embodiment of the all solid state battery of the present disclosure.

In FIG. 3B, the electrode body layer 20 has the positive electrode active material layer 22 and the conductive member 24. The conductive member 24 protrudes towards the solid electrolyte layer 30 from the outer edge of the positive electrode current collector layer 10 and contacts a lateral surface of the positive electrode active material layer 22. The positive electrode active material layer 22 contacts the positive electrode current collector layer 10 and the solid electrolyte layer 30.

FIG. 3C is a schematic diagram indicating the structure of the current collector layer, the conductive member, the active material layer and the solid electrolyte layer in still another embodiment of the all solid state battery of the present disclosure.

In FIG. 3C, the electrode body layer 20 has the positive electrode active material layer 22 and the conductive member 24. The conductive member 24 protrudes toward the solid electrolyte layer 30 from the outer edge and center of the positive electrode current collector layer 10 and contacts a lateral surface of the positive electrode active material layer 22. The positive electrode active material layer 22 contacts the solid electrolyte layer 30.

(Material of Conductive Member)

There are no particular limitations on the material of the conductive member provided it is a material that has electrical conductivity. Examples of the material of the conductive member include, but are not limited to, stainless steel (SUS), aluminum, copper, nickel, iron, titanium and carbon.

The material of the conductive member is preferably a material that is resistant to the occurrence of an oxidation-reduction reaction at the action potential of the active material layer contacted by the conductive member. For example, in the case the conductive member contacts the positive electrode active material layer, the material of the conductive member is preferably aluminum, nickel, titanium or carbon, while in the case the conductive member contacts the negative electrode active material layer, the material of the conductive member is preferably copper, nickel or titanium.

The conductive member may be, for example, a single member composed of the material of the conductive member, may be formed by assembling a plurality of materials, or may be molded by depositing a powder of the material of the conductive member on the active material layer or solid electrolyte layer followed by pressing by applying a load.

The following provides a detailed explanation of the current collector layer, the active material layer and the solid electrolyte layer of the all solid state battery. Furthermore, although the explanation uses examples of each member of a battery laminate of an all solid state lithium ion secondary battery for the sample of facilitating understanding of the present disclosure, the all solid state battery of the present disclosure can be applied over a wide range without being limited to a lithium ion secondary battery.

<Active Material Layer>

The active material layer contacts the solid electrolyte layer. As a result, ions are able to migrate between the active material layer and the solid electrolyte layer.

Although the active material layer may be either of a positive electrode active material layer or negative electrode active material layer, it is preferably a positive electrode active material layer. This is because the electrical conductivity of a positive electrode active material layer can be maintained even in the case of using a positive electrode active material having low electrical conductivity for the positive electrode active material layer.

Although the active material layer may also contain a conductive additive, since a conductive additive is thought to lower ionic conductivity of the active material layer despite of improving electrical conductivity of the active material layer, the active material preferably does not contain a conductive additive. A conductive additive may be contained in the active material layer at 5% by weight or less, 3% by weight or less, 1% by weight or less or 0% by weight based on the total weight of the active material layer.

Although there are no particular limitations on the thickness of the active material layer, it may be 1 µm to 2000 µm. The thickness of the active material layer is preferably 200 µm or more, 300 µm or more, 500 µm or more or 1000 µm or more.

Since it is thought that electrical conductivity and ionic conductivity of the active material layer decrease rapidly in the case the thickness of the active material layer is large, the configuration of the all solid state battery of the present disclosure is particularly effective in cases in which the thickness of the active material layer is large.

(Positive Electrode Active Material Layer)

The positive electrode active material layer at least contains a positive electrode active material and preferably further contains a solid electrolyte to be subsequently described. In addition thereto, the positive electrode active material layer can also contain, for example, an additive such as a conductive additive or binder used in the positive electrode active material layer of all solid state batteries in accordance with the application and purpose of use thereof.

There are no particular limitations on the material of the positive electrode active material. Examples of the material of the positive electrode active material include, but are not limited to, lithium cobalt oxide ($LiCoO_2$), lithium nickel oxide ($LiNiO_2$), lithium manganese oxide ($LiMn_2O_4$), and Li—Mn spinels substituted with heterogeneous elements having a composition represented by $LiCo_{1/3}Ni_{1/3}Mn_{1/3}O_2$ or $Li_{1+x}Mn_{2-x-y}M_yO_4$ (wherein, M represents one or more types of metal elements selected from Al, Mg, Co, Fe, Ni and Zn).

There are no particular limitations on the conductive additive. Examples of the conductive additive include, but are not limited to, carbon materials such as a vapor grown carbon fibers (VGCF) or carbon nanofibers and metal materials.

There are no particular limitations on the binder. Examples of the binder include, but are not limited to, materials such as polyvinylidene difluoride (PVdF), carboxymethyl cellulose (CMC), butadiene rubber (BR) and styrene butadiene rubber (SBR), and combinations thereof.

(Negative Electrode Active Material Layer)

The negative electrode active material layer at least contains a negative electrode active material and preferably further contains a solid electrolyte to be subsequently described. In addition thereto, the negative electrode active material layer can also contain, for example, an additive such as a conductive additive or binder used in the negative electrode active material layer of all solid state batteries in accordance with the application and purpose of use thereof.

There are no particular limitations on the material of the negative electrode active material and the material is preferably capable of storing and releasing metal ions such as lithium ions. Examples of the negative electrode active material include, but are not limited to, alloy-based negative electrode active materials and carbon materials.

There are no particular limitations on the alloy-based negative electrode active material and examples thereof include Si alloy-based negative electrode active materials and Sn alloy-based negative electrode active materials. Examples of Si alloy-based negative electrode active materials include silicon, silicon oxide, silicon carbide, silicon nitride and solid solutions thereof. In addition, the Si alloy-based negative electrode active material can contain elements other than silicon such as Fe, Co, Sb, Bi, Pb, Ni, Cu, Zn, Ge, In, Sn or Ti. Examples of Sn alloy-based negative electrode active materials include tin, tin oxide, tin nitride and solid solutions thereof. In addition, the Sn alloy-based negative electrode active material can contain elements other than tin such as Fe, Co, Sb, Bi, Pb, Ni, Cu, Zn, Ge, In, Ti or Si. Among these, Si alloy-based negative electrode active materials are preferable.

There are no particular limitations on the carbon material and examples thereof include hard carbon, soft carbon and graphite.

With respect to other additives such as solid electrolytes, conductive additives or binders used in the negative electrode active material layer, those explained in the aforementioned section entitled "Positive Electrode Active Material Layer" and the subsequently described "Solid Electrolyte Layer" can be suitably employed.

<<<Current Collector Layer>>>

The current collector layer contacts the conductive member at least at a portion on the surface on the active material layer side.

Examples of the current collector layer include the positive electrode current collector layer and the negative electrode current collector layer.

<Positive Electrode Current Collector Layer>There are no particular limitations on the material used for the positive electrode current collector layer and materials able to be used in all solid state batteries can be suitably used. Examples of the material used for the positive electrode current collector layer include, but are not limited to, SUS, aluminum, copper, nickel, iron, titanium and carbon.

There are no particular limitations on the form of the positive electrode current collector layer and examples thereof include a foil, sheet or mesh net. Among these, a foil is preferable.

<Negative Electrode Current Collector Layer>

There are no particular limitations on the material used for the negative electrode current collector layer and materials able to be used in all solid state batteries can be suitably used. Examples of the material used for the negative electrode current collector layer include, but are not limited to, SUS, aluminum, copper, nickel, iron, titanium and carbon.

There are no particular limitations on the form of the negative electrode current collector layer and examples thereof include a foil, sheet or mesh net. Among these, a foil is preferable.

<<Solid Electrolyte Layer>>

The solid electrolyte layer at least contains a solid electrolyte. There are no particular limitations on the solid electrolyte and materials able to be used as the solid electrolyte of all solid state batteries can be used. Examples of solid electrolytes include, but are not limited to, sulfide solid electrolytes, oxide solid electrolytes and polymer electrolytes.

Examples of sulfide solid electrolytes include, but are not limited to, sulfide-based amorphous solid electrolytes, sulfide-based crystalline solid electrolytes and argyrodite-type solid electrolytes. Specific examples of sulfide solid electrolytes include, but are not limited to, $Li_2S$—$P_2S_5$-based sulfide solid electrolytes (such as $Li_7P_3S_{11}$, $Li_3PS_4$ or $Li_8P_2S_9$), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$-based solid electrolytes (such as $Li_{13}GeP_3S_{16}$ or $Li_{10}GeP_2S_{12}$), $LiI$—$Li_2S$—$P_2O_5$, $LiI$—$Li_3PO_4$—$P_2S_5$, $Li_{7-x}PS_{6-x}Cl_x$ and combinations thereof.

Examples of oxide solid electrolytes include, but are not limited to, $Li_7La_3Zr_2O_{12}$, $Li_{7-x}L_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$ and $Li_{3+x}PO_{4-x}N_x$(LiPON).

(Polymer Electrolyte)

Examples of polymer electrolytes include, but are not limited to, polyethylene oxide (PEO), polypropylene oxide (PPO) and copolymers thereof.

The solid electrolyte may be glass or crystallized glass (glass-ceramic). In addition, the solid electrolyte layer may contain a binder and the like as necessary in addition to the aforementioned solid electrolyte. Specific examples of binders are the same as the binders exemplified in the aforementioned section entitled "Positive Electrode Active Material Layer" and an explanation thereof is omitted here.

EXAMPLES

Example 1

The all solid state battery of Example 1 was produced in the manner described below.

<Synthesis of Solid Electrolyte>

Starting materials consisting of $Li_2S$, $P_2S_5$, LiI and LiBr were weighed out so as to yield the compositional formula 75(0.75$Li_2S$.0.25$P_2S_5$).10LiI.15LiBr (mol %).

1 g of the weighed mixture was placed in the pot (45 cc, made of $ZrO_2$) of a planetary ball mill together with 500 $ZrO_2$ balls having a diameter of 4 mm and sealed inside. This container was then attached to the planetary ball mill and mechanically milled for 45 hours at a pedestal rotating speed of 510 rpm to obtain a vitreous sulfide solid electrolyte precursor.

The resulting vitreous sulfide solid electrolyte precursor was heat-treated at 200° C. to 350° C. to obtain a powder of a glass-ceramic sulfide solid electrolyte.

<Preparation of Positive Electrode Mixture>

1500 mg of $LiNi_{1/3}Mn_{1/3}Co_{1/3}O_2$ particles coated with $LiNbO_3$ as a positive electrode active material, 445 mg of solid electrolyte and 43 mg of vapor grown carbon fibers (VGCF) were mixed to prepare a positive electrode mixture.

<Preparation of Negative Electrode Mixture>

1000 mg of Si particles as a negative electrode active material, 727 mg of solid electrolyte and 64 mg of conductive additive in the form of vapor grown carbon fibers were mixed to prepare a negative electrode mixture.

<Production of All Solid State Battery>

85 mg of the positive electrode mixture were placed in a pelleting machine having a diameter of 10 mm followed by pressing at a load of 2 tons to form a pellet-shaped positive electrode active material layer. The thickness of the positive electrode active material layer was about 430 μm.

100 mg of the solid electrolyte were placed in a cylinder having a diameter of 11.28 mm followed by pressing at a load of 1 ton to form a solid electrolyte layer. The positive electrode active material layer having a diameter of 10 mm was placed on the central portion of the solid electrolyte layer having a diameter of 11.28 mm inside the cylinder followed by pressing at a load of 3 tons to join the positive electrode active material layer and the solid electrolyte layer. Aluminum powder was placed on top of and around the positive electrode active material within the cylinder followed by pressing at a load of 1 ton to form a structure in which the top and periphery of the positive electrode active material layer were covered with a conductive member composed of aluminum. 156 mg of the negative electrode mixture were placed on the solid electrolyte layer on the opposite side of the cylinder followed by pressing at a load of 1 ton to form a negative electrode active material layer. A stainless steel (SUS) piston was inserted from both sides of the cylinder followed by restraining at a pressure of 15 kgf to complete the all solid state battery. The resulting all solid state battery had a structure similar to that of the all solid state battery shown in FIG. 1.

Example 2

The all solid state battery of Example 2 was produced in the same manner as Example 1 with the exception of not using vapor grown carbon fibers as the conductive additive when preparing the positive electrode mixture.

Comparative Example 1

The all solid state battery of Comparative Example 1 was produced in the same manner as Example 1 with the exception of not placing aluminum powder on the top of and around the positive electrode active material within the cylinder, or in other words, not forming a structure in which the positive electrode active material layer is covered with a conductive member. The resulting all solid state battery had the same structure as that of the all solid state battery shown in FIG. 2 with the exception of the width of the positive electrode active material layer being narrower than the width of the solid electrolyte layer.

Comparative Example 2

The all solid state battery of Comparative Example 2 was produced in the same manner as Example 2 with the exception of not placing aluminum powder on the top of and around the positive electrode active material within the cylinder, or in other words, not forming a structure in which the positive electrode active material layer is covered with a conductive member. The resulting all solid state battery had the same structure as that of the all solid state battery shown in FIG. 2 with the exception of the width of the positive electrode active material layer being narrower than the width of the solid electrolyte layer.

<<Measurement of Input Characteristics of All Solid State Batteries of Examples 1 and 2 and Comparative Examples 1 and 2>>

<Measurement Method>

The all solid state batteries of Examples 1 and 2 and Comparative Examples 1 and 2 were each charged to 4.37 V at 1 mA followed by adjusting the voltage to 3.00 V at the same current. Subsequently, the all solid state batteries were charged to 4.37 V at 20 mA followed by measurement of charge capacity during that time.

<Results>

Figure 4:
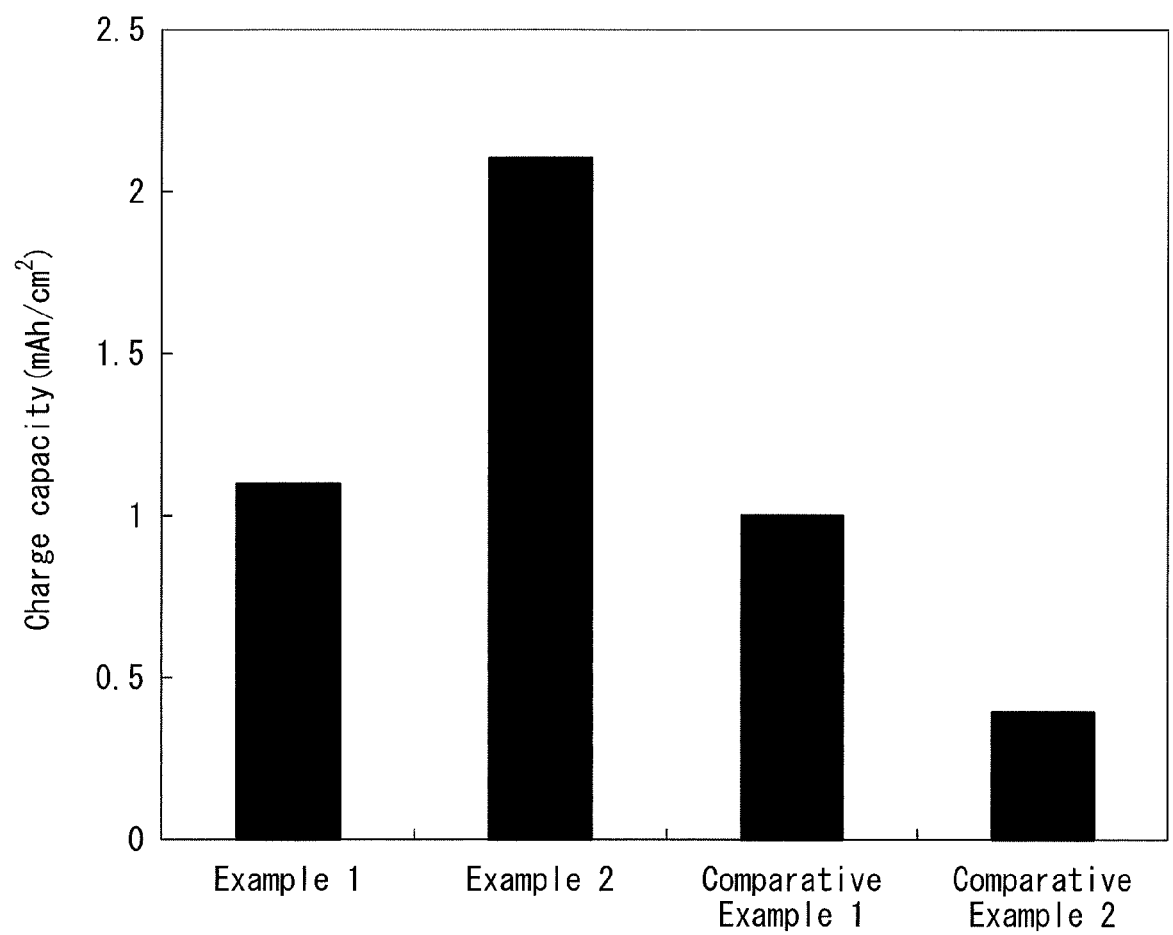
FIG. 4 is a graph comparing the charge capacities of all solid state batteries of Examples 1 and 2 and Comparative Examples 1 and 2.

The measurement results are shown in Table 1 and FIG. 4.

TABLE 1

| Example | Conductive Member | Conductive Additive | Charge Capacity (mAh/cm$^2$) |
|---|---|---|---|
| Example 1 | Present | Present | 1.1 |
| Example 2 | Present | Absent | 2.1 |
| Comparative Example 1 | Absent | Present | 1.0 |
| Comparative Example 2 | Absent | Absent | 0.4 |

FIG. 4 is a graph comparing the charge capacities of all solid state batteries of Examples 1 and 2 and Comparative Examples 1 and 2.

As shown in FIG. 4 and Table 1, when a comparison is made between Example 1 and Comparative Example 1, which use a conductive additive in the positive electrode active material layer, the charge capacity (1.1 mAh/cm$^2$) of the all solid state battery of Example 1 that uses a conductive member was greater than the charge capacity (1.0 mAh/cm$^2$) of the all solid state battery of Comparative Example 1 that does not use a conductive member.

In addition, as is shown in FIG. 4 and Table 1, when a comparison is made between Example 2 and Comparative Example 2, which do not use a conductive additive in the positive electrode active material layer, the charge capacity (2.1 mAh/cm$^2$) of the all solid state battery of Example 2 that uses a conductive member was greater than the charge capacity (0.4 mAh/cm$^2$) of the all solid state battery of Comparative Example 2 that does not use a conductive member.

In addition, when a comparison is made between Example 1 and Example 2, which use a conductive member in the positive electrode active material layer, the charge capacity (2.1 mAh/cm$^2$) of the all solid state battery of Example 2 that does not use a conductive additive was greater than the charge capacity (1.1 mAh/cm$^2$) of the all solid state battery of Example 1 that uses a conductive additive.

This result indicates that charge-discharge capacity can be improved by arranging a conductive member in an all solid state battery. In particular, this result indicates that a particularly high charge-discharge capacity can be achieved in the case of arranging a conductive member and not containing a conductive additive in the positive electrode active material layer.

This is thought to be the result of having improved electrical conductivity of the positive electrode active material layer by arranging a conductive member therein. In particular, the reason for being able to achieve a high charge-discharge capacity in the case of not containing a conductive additive in the positive electrode active material layer is thought to be due to ionic conductivity of the positive electrode active material layer having been secured while imparting electrical conductivity to the positive electrode active material layer by the conductive member.

Reference Examples 1 to 4

<Production of All Solid State Batteries>

The all solid state batteries of Reference Examples 1 to 4 were produced in the manner described below using a positive electrode mixture, negative electrode mixture and solid electrolyte prepared in the same manner as Example 2. Thus, the positive electrode mixtures used in Reference Examples 1 to 4 contained a positive electrode active material and solid electrolyte but did not contain a conductive additive.

More specifically, 100 mg of solid electrolyte were placed in a cylinder having a diameter of 11.28 mm followed by pressing at a load of 1 ton to form a solid electrolyte layer. The positive electrode active material layer was placed on the solid electrolyte layer within the cylinder followed by pressing at a load of 1 ton to join the positive electrode active material layer and the solid electrolyte layer. 156 mg of the negative electrode mixture were placed on the solid electrolyte layer from the opposite side of the cylinder followed by pressing at a load of 6 tons to form the negative electrode active material layer. A stainless steel (SUS) piston was inserted from both sides of the cylinder followed by restraining at a pressure of 15 kgf to complete the all solid state battery.

Furthermore, in the production of the all solid state batteries of Reference Examples 1 to 4, the amount of positive electrode mixture was changed so that the thickness of the positive electrode active material layer formed was as shown in Table 2 below. The capacities (mAh/cm$^2$) shown in Table 2 are calculated values determined from the theoretical amount and content of the positive electrode active material, the area of the surface of the positive electrode active material layer and the thickness thereof.

TABLE 2

| Example | Thickness of Positive Electrode Active Material Layer (μm) | Capacity (mAh/cm$^2$) |
|---|---|---|
| Reference Example 1 | 50 | 2 |
| Reference Example 2 | 100 | 4 |
| Reference Example 3 | 200 | 8 |
| Reference Example 4 | 300 | 12 |

<<Measurement of Input Characteristics of All Solid State Batteries of Reference Examples 1 to 4>>

<Measurement Method>

The input characteristics of the all solid state batteries of Reference Examples 1 to 4 were measured using the same method as that used to measure input characteristics of the all solid state battery of Example 1.

<Results>

Figure 5:
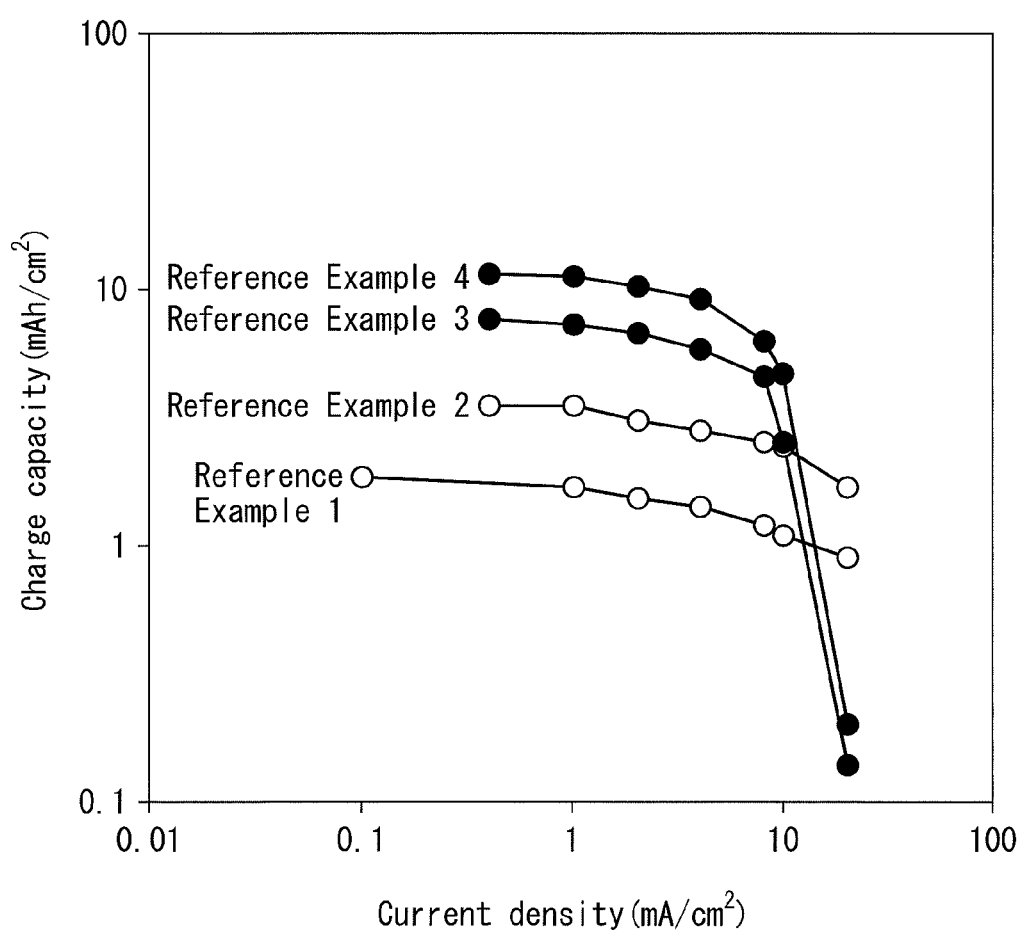
FIG. 5 is a graph indicating the relationship between thickness of a positive electrode active material layer and input characteristics in all solid state batteries of Reference Examples 1 to 4.

The measurement results are shown in FIG. 5.

FIG. 5 is a graph indicating the relationship between active material layer thickness and input characteristics in the all solid state batteries of Reference Examples 1 to 4. As shown in FIG. 5, in Reference Example 1 (layer thickness: 50 μm) and Reference Example 2 (layer thickness: 100 μm), in which thickness of the positive electrode active material layer was small, there was little change in input characteristics even when current density was increased. In contrast, in Reference Example 3 (layer thickness: 200 μm) and Reference Example 4 (layer thickness: 300 μm), in which thickness of the positive electrode active material layer was large, input characteristics decreased rapidly when current density was increased.

This result shows that when layer thickness of the all solid state battery becomes large, ionic conductivity and electrical conductivity of the positive electrode active material layer decrease to thereby cause input characteristics to fall at high current density.

REFERENCE SIGNS LIST

10 Positive electrode current collector layer
20 Positive electrode electrode body layer
22 Positive electrode active material layer
24 Conductive member
24a Protruding portion
24b Conductive layer
30 Solid electrolyte layer
40 Negative electrode active material layer
50 Negative electrode current collector layer
100 All solid state battery

The invention claimed is:

1. An all solid state battery, comprising:
a first current collector layer, an electrode body layer, a solid electrolyte layer, a second active material layer, and a second current collector layer which are laminated in that order, wherein
the electrode body layer has a first active material layer and a conductive member,
the first active material layer contacts the solid electrolyte layer, wherein the thickness of the first active material layer is 200 μm-2000 μm,
the conductive member contacts the first current collector layer and has a protruding portion, and
the protruding portion protrudes towards the solid electrolyte layer from at least a portion of a surface of the first current collector layer on the electrode body layer side, and contacts a surface of the first active material layer in the direction of thickness thereof.

2. The all solid state battery according to claim 1, wherein the first active material layer is a positive electrode active material layer.

3. The all solid state battery according to claim 1, wherein an end of the protruding portion of the conductive member forms a same plane with a second surface of the first active material layer on the solid electrolyte layer side.

4. The all solid state battery according to claim 1, wherein the conductive member has a conductive layer extending between the first active material layer and the first current collector layer, and the protruding portion protrudes towards the solid electrolyte layer from the conductive layer.

5. The all solid state battery according to claim 1, wherein the protruding portion of the conductive member includes (i) a central protruding portion having a columnar shape protruding towards the solid electrolyte layer from a center of the surface of the first current collector layer on the electrode body layer side and (ii) an outer protruding portion having a cylinder shape protruding towards the solid electrolyte layer from an outer edge of the first current collector layer on the electrode body layer side, and
wherein an end of the central protruding portion and an end of the outer protruding portion form a same plane with a second surface of the first active material layer on the solid electrolyte layer side.

6. The all solid state battery according to claim 1, wherein the protruding portion of the conductive member protrudes towards the solid electrolyte layer from an outer edge of the first current collector layer and without being in contact with a side of the solid electrolyte layer.

* * * * *